(12) United States Patent
Hallén et al.

(10) Patent No.: US 6,331,688 B1
(45) Date of Patent: *Dec. 18, 2001

(54) USE OF A METAL POWDER FOR SURFACE COATING BY SUBMERGED ARC WELDING

(75) Inventors: Hans Hallén, Helsingborg; Karl-Erik Johansson, Höganäs, both of (SE)

(73) Assignee: Höganäs AB, Hoganas (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,332

(22) Filed: Mar. 23, 1999

Related U.S. Application Data

(63) Continuation of application No. PCT/SE97/01601, filed on Sep. 23, 1997.

(30) Foreign Application Priority Data

Sep. 23, 1996 (SE) .................................................... 9603486

(51) Int. Cl.[7] .................................................... B23K 9/04
(52) U.S. Cl. ........................ 219/73.21; 219/73.2; 219/73; 219/72; 219/76.1; 219/136; 219/137.2
(58) Field of Search ................................ 219/73.21, 73.2, 219/73, 72, 76.1, 136, 137.2

(56) References Cited

U.S. PATENT DOCUMENTS

| | | | |
|---|---|---|---|
| 2,191,471 | * 2/1940 | Hopkins | 219/10 |
| 2,810,063 | * 10/1957 | Brashear, Jr. | 219/130 |
| 3,358,115 | * 12/1967 | Arnoldy | 219/76 |
| 3,881,912 | * 5/1975 | Mikurak | 75/0.5 |
| 4,000,010 | * 12/1976 | Sekimoto et al. | 148/3 |
| 4,020,314 | * 4/1977 | Barger | 219/73 |
| 4,621,183 | * 11/1986 | Takeuchi et al. | 219/121 |
| 4,943,698 | * 7/1990 | Mengel | 219/121.47 |
| 4,948,936 | * 8/1990 | Landry | 219/76.14 |
| 5,140,140 | * 8/1992 | Pollack | 219/137 |

FOREIGN PATENT DOCUMENTS

| | | |
|---|---|---|
| 2626824B2 | 1/1977 | (DE) . |
| 900337 | 7/1962 | (GB) . |

OTHER PUBLICATIONS

"Hardfaced Roll Manufacturing and Refurbishment", Service Publicaion of Trimay Engineering Services, Triten Corporation, Houston, Texas, pp. 1–4.

"Trimay™ Wear Resistant Overlay Steel Plate: Range Summary", Service Publication of Triten Corporation, Houston, Texas, pp. 1–4.

"Triten™ Wear Resistant Overlay Steel Plate: Range Summary", Service Publication of Triten Corporation, Houston, Texas, pp. 1–4.

"Triten™: A Guide to the Evaluation and Selection of Hardfaced Plate", Service Publication of Triten Corporation, Houston, Texas, pp. 1–8.

"Bulkwelding Process", Service Publication of Tapco International, Houston, Texas, pp. 1–4.

"The Latest Word in Hardfacing" R. A. Wilson, *Iron Age* (Aug. 14, 1969), pp. 1–3.

"Developing and Selection of Filler Metals for Bulk Welding", R.F. Arnoldy et al., *Welding Journal* (Feb. 1969), pp. 1–5.

"Instructions for TAPCO EM–5 Electronic Metal Meter", TAPCO International, Houston, Texas, pp. 1–10.

"Bulk–welded hardfaced overlay in materials handling", *Welding and Joining Europe* (Apr. 1999) pp. 29–31.

"Adding powered metal filler speeds deposition rate", G. H. Reynolds et al., *Metal Construction,* (Sep. 1978) pp. 426–430.

* cited by examiner

*Primary Examiner*—Patrick Ryan
*Assistant Examiner*—M. Alexandra Elve
(74) *Attorney, Agent, or Firm*—Burns, Doane, Swecker & Mathis, L.L.P.

(57) ABSTRACT

The present invention concerns the use of a pre-alloyed atomised powder in combination with at least one melting electrode wire in the SAW method. The electrode wire is an unalloyed or low-alloy metal wire and the metal powder is a metal powder containing a higher percentage of alloying elements than the electrode wire.

23 Claims, No Drawings

USE OF A METAL POWDER FOR SURFACE COATING BY SUBMERGED ARC WELDING

This is a continuation of International Application No. PCT/SE97/01601, filed Sept. 23, 1997, that designates the United States of America and which claims priority from Swedish Application No. 9603486-3, filed Sept. 23, 1996.

The present invention concerns a metal powder for submerged arc welding. Specifically the invention concerns the use of high-alloy metal powders for surface coating of a metal substrate by the submerged arc welding method.

The submerged arc welding (SAW) method is a well known method, the principle of which is described in eg Chapter 28 of Welding Handbook No 2, 4th Edition, (1958) Section 2, Welding Processes, which is hereby incorporated by reference.

At present the SAW method is considered to be a very rational method for welding and surface coating. Even though this method is highly rational there is an interest to increase its productivity. One way of increasing the productivity is to use multi-wire systems in combination with high amperage. Another way is to add carefully measured amounts of metal powders to the weld joint during the whole welding process. The metal powder can be added either by "forward feed" which means that the powder is fed in front of the flux feed and the electrode wire, or by "direct feed" which means that the powder is magnetically attached to the electrode wire(s). The metal powders currently used are essentially unalloyed metal powders, whereas the elements of the desired for the final joint and the compostion thereof is decided by the electrode wire(s) or electrode cord(s), which contain high amounts of alloying elements.

According to the present invention it has now been found that the SAW method can be improved by using a prealloyed, atomised metal powder containg high amounts of alloying elements in combination with at least one melting electrode wire or cord consisting of unalloyed or low-alloy metal. It is essential that the powder is prealloyed as otherwise it will not be possible to obtain a uniform coating. Another important feature is that the powder is provided on the outside of or separate from the electrode wire used in the SAW method.

Especially important advantages are obtained when the method according to the present invention is applied for surface coating of metal substrates such as low alloy steel substates which have to be coated in order to increase the hardness, the strength, the oxidation and the wear resistance. The problems with currently used coating methods concern low productivity and comparatively high dilution of the metal substrate surface. A consequence of the high dilution is that several layers and large amounts of the alloying material are required in order to obtain a surface coating having the desired composition and properties. In brief this means that the coated substrates obtained by the currently used methods are expensive and the productivity is low.

U.S. Pat. No. 2,810,063 discloses a method, wherein a metal powder is used for submerged arc welding. The powders specifically used in this patent include ferrochromium, ferromanganese and ferromolybdenum in combination with a soft iron powder and a sodium silicate. A distinguishing feature according to this patent is the presence of the iron powder which is essential in order to make the alloying elements magnetically associated with the electrode rod or wire.

This disadvantage, which in practice makes the method according to the U.S. patent unacceptable for industrial applications, where a high degree of uniformity is required, can be avoided by using a prealloyed metal powder according to the present invention.

A method similar to that according to the U.S. Pat. No. 2,810,063 is disclosed in the U.S. Pat. No. 2,191,471.

By using a prealloyed powder according to the present invention, is has been found that not only a very uniform structure can be obtained but also that the microstructure will be finer. The risk of obtaining microcracks in the coating is thus reduced and the strength is higher. By supplying the prealloyed powder separately, i e by forward feeding the powder, or on the outside of the electrode surface i.e. by feeding the powder magnetically attached to the outside of electrode(s), the melted substrate surface is efficiently cooled and the melting bath can be reduced. The amounts of expensive alloying elements can be decreased due to the fact the alloying elements are not diluted to the same extent as when the major part of the alloying elements are included in the melting electrode wire or cord. An additional advantage is that the surfacing or coating rate can be increased. It has thus been found the for a given area to be coated the productivity is three times as high as when the open arc method is used. In comparison with coating according to the conventional SAW method, i.e. where the material of the electrode is comparatively high alloyed and the metal powder essetially unalloyed, the present invention offers an improvment of about 50 percent.

The type and the amount of metal powder are selected in such a way that the powder in combination with the electrode wire gives the desired coating composition of the substrate. The powder, which can be magnetic or non-magnetic powder, can be selected from a wide variety of available powders. If the powder is magnetic it can be fed or transported to the substrate together with and fixed on a (magnetic) electrode wire. Magnetic powders are especially preferred for coating rolls. If non-magnetic, the metal powder is fed directly to or in front of the melting bath on the substrate.

An essential feature is that the powder is prealloyed and contains high amounts of alloying elements, which in this context means that amount of alloying elements of the powder is higher than that of the wire. The amount of the alloying elements should be least 2% by weight of the powder in order to be effective. The amount of alloying elements of the metal powder as well as the feed of the metal powder and the electrode wire are selected in view of the desired composition of the final coating of the substrate. The powder feeding is usually between 30% and 80% of the total filler metal, i.e. the powder metal and the wire metal. By using gas or water atomised prealloyed powders, a high degree of accuracy of the coating composition can be obtained.

Examples of suitable alloying elements in iron-based powders are Cr, Ni, Mo, Mn, V, Nb, Si, N, C, Co, Ti and W.

An example of a high-alloy iron-based powder which is well suited for surface coating according to the invention is a powder essentially consisting of iron and 0–55% by weight of Cr, 0–50 by weight of Ni, 0–35 by weight of Mo, 0–15 by weight of Mn, 0–17 by weight of V, 0–15 by weight of Nb, 0–5 by weight of Si, 0–0.8 by weight of N, 0–8 by weight of C, 0–55 by weight of Co, Ti 0–15 and 0–65 by weight of W.

Preferred amounts of the alloying elements are 12–35% by weight of Cr, less than 25% by weight of Ni, less that 15% by weight of Mo, 0.05–15% by weight of Mn, 0–8% by weight of V, 0–8% by weight of Nb, 0–10.0% by weight of Si, less than 0.5% by weight of N and 0.005–5% by weight of C.

More specifically this powder could include 20–34% by weight of Cr, 0–18% by weight of Ni, 0,5–8% by weight of Mo, 0.1–5% by weight of Mn, 0.1–2.0% by weight of V, 0.1–2.0% by weight of Nb, 0.05–3.0% by weight of Si, 0.005–0.4% by weight of N and 0.005–0.8% by weight of C.

Another interesting powder composition which is useful according to the invention is an iron-based powder including 0–40% by weight of Co, 7–17% by weight of W, 5–15% by weight of Mo, 0.05–2.5% by weight of Mn, 1–6% by weight of V, 0.05–2.5% by weight of Si, less that 0.40% by weight of N and 1–4.0% by weight of C.

According to the invention, the main purpose of the melting electrode wire is to provide sufficient heat for melting the metal powder and the substrate surface. A special advantage is that, if combined with different types of metal powders having different alloying elements, the same electrode wire can be used for different types of coatings.

When iron-based, the electrode wire can by unalloyed or low-alloy electrode wire, such as S1 or S2 according to DIN 8557. All unalloyed or low-alloy electrode wires including metal cord and flux cord electrodes, i e hollow electrode, can, however, be used according to the invention.

By using the above combination of electrode wire and metal powder, it is possible to apply, during the same period of time, a larger amount of coating material on the metal substrate than by using conventional coating methods. Another advantage is that it is possible to obtain the correct surface coating composition with thinner coatings, which means that considerable savings can be made as to the expensive coating material.

According to the invention, the ratio of electrode wire to powder could preferably vary between 2.33 and 0.25. Most preferably the ratio is less than 1.5.

The metal substrate can have essentially any form and the coating method according to the invention is only limited by practical considerations. Typical substrates could be low-alloy steels or tool steels, i.e. the chemical composition of the substrate can vary within a wide range.

The flux used in the method according to the invention is preferably a basic unalloyed flux.

The invention is further illustrated by the following examples:

EXAMPLE 1

Substrate: Roll (diameter 227 mm, length 305 mm) having a peripheral rotating speed of 21 cm/min.
Power source: 650 A, 32.2 V
Twin arc: OK 1220 S2 diameter 2.5 mm available from ESAB AB, Sweden
Metal powder X: 345-4
Flux: Basic unalloyed.

A final 3 mm coating having the required composition was obtained by applying a magnetic atomised prealloyed iron powder having the composition indicated in the table at a rate of 15.0 kg/h and the wire at a rate of 9.5 kg/h, which means that the desired coating was provided at a rate of 24.5 kg/h. The powder was magnetically attached to the outside of electrode wire. The width of the coating was in this case 55 mm. This rate should be compared with conventional coating methods like the SAW method using high-alloy coating materials in the form of strips, wires etc. with no external feeding of metal powder. Due to the high amount of melted substrate material, only approximately 10 kg/h coating material can be delivered to the substrate surface according to the known SAW method and therefore, due to the high dilution, several layers must be provided before the required surface coating composition is obtained.

The following table 1 shows the composition of the required coating, the wire, the metal powder and the final composition of cuttings obtained from the roll.

TABLE 1

|    | Wire composition % by weight | Powder composition % by weight | Final surface coating composition % by weight |
|----|---|---|---|
| C  | 0.099 | 0.145 | 0.129 |
| Si | 0.10  | 0.43  | 0.34  |
| Mn | 1.00  | 0.48  | 0.89  |
| S  | 0.015 | 0.006 | 0.013 |
| P  |       | 0.013 | 0.012 |
| Ni |       | 8.82  | 4.01  |
| Cr |       | 27.35 | 12.7  |
| Mo |       | 2.03  | 1.06  |
| V  |       | 0.55  | 0.25  |
| N  | 0.0037| 0.052 | 0.039 |
| Nb |       | 0.38  | 0.19  |

EXAMPLE 2

The method according to Example 1 was repeated with an N alloyed powder. In this example 13.8 kg powder/h and 9.5 kg electrode wire/h were required in order to get the desired coating. The results are listed in the following table 2.

TABLE 2

|    | Wire composition % by weight | Powder composition % by weight | Final surface coating composition % by weight |
|----|---|---|---|
| C  | 0.099 | 0.020 | 0.075 |
| Si | 0.10  | 0.41  | 0.27  |
| Mn | 1.00  | 2.51  | 1.51  |
| S  | 0.015 | 0.008 | 0.014 |
| P  |       | 0.014 | 0.014 |
| Ni |       | 5.08  | 2.35  |
| Cr |       | 29.09 | 12.9  |
| Mo |       | 4.78  | 2.15  |
| V  |       | 0.58  | 0.27  |
| N  | 0.0037| 0.169 | 0.079 |
| Nb |       | 0.45  | 0.18  |

EXAMPLE 3

The method according to Example 1 was repeated with a magnetic, alloyed powder having the composition according to Table 3. In this example a single arc S2 diameter 4.0 mm was used.

8 kg powder/h was direct fed, i.e. magnetically attached to the the outside of the electrode, to the substrate plate and 8.4 kg/h of the powder was forward fed to the substrate plate.

The wire feed was 8 kg/h for both direct feeding and forward feeding.

The results are listed in the following table 3.

TABLE 3

|    | Wire composition % by weight | Powder composition % by weight | Final surface coating composition[1] % by weight | Final surface coating composition[2] % by weight |
|----|---|---|---|---|
| C  | 0.10  | 0.18 | 0.15 | 0.16 |
| Si | <0.15 | 0.67 | 0.43 | 0.41 |

TABLE 3-continued

|    | Wire composition % by weight | Powder composition % by weight | Final surface coating composition[1] % by weight | Final surface coating composition[2] % by weight |
|----|------|-------|-------|--------|
| Mn | 1.00 | 0.44  | 1.01  | 1.01   |
| S  |      | 0.008 | 0.005 | 0.008  |
| P  |      |       | 0.030 | 0.0288 |
| Ni |      | 7.200 | 2.137 | 2.100  |
| Cr |      | 28.90 | 8.434 | 8.319  |
| Mo |      | 3.16  | 0.91  | 0.89   |
| V  |      | 0.38  | 0.114 | 0.114  |

[1] powder applied on the outside of the electrode
[2] forward feeding

What is claimed is:

1. A method of submerged arc welding of a metal substrate with one or more consumable electrode wires or electrode cords, the method comprising direct feeding an atomized prealloyed metal powder containing high amounts of alloying elements into a weld pool formed by the submerged arc, the powder being magnetically attached to the outside of the melting consumable electrode.

2. The method of claim 1, wherein the powder is an iron-based powder.

3. The method of claim 1, wherein the powder is a gas atomized or water atomized powder.

4. The method of claim 1, wherein the one or more electrode wires or electrode cords are of an unalloyed of low-alloy metal.

5. The method of claim 1, wherein the one or more electrode wires or electrode cords are of an unalloyed or low-alloy metal.

6. The method of claim 1, wherein the powder is fed to the weld pool in a ratio of consumable electrode to powder of 2.33 to 0.25.

7. The method of claim 6, wherein the powder is fed to the weld pool in a ration of consumable electrode to powder of less than 1.5.

8. The method of claim 1, wherein the amount of alloying elements in the powder is at least 2% by weight.

9. The method of claim 2, wherein the alloying elements include, in weight %, 0 to 55% Cr, 0 to 50% Ni, 0 to 35% Mo, 0 to 15% Mn, 0 to 17% V, 0 to 15% Nb, 0 to 5% Si, 0 to 0.8% N, 0 to 8% C, 0 to 55% Co, 0 to 15% Ti, and 0 to 65% W.

10. The method of claim 2, wherein the powder consists essentially of, in weight %, iron and 0 to 40% Co, 7 to 17% W, 5 to 15% Mo, 0.05 to 2.5% Mn, 1 to 6% V, 0.05 to 2.5% Si, less than 0.40% N and 1 to 4.0% C.

11. The method of claim 2, wherein the powder consists essentially of an iron-based powder including, in weight %, 12 to 35% Cr, less than 25% Ni, less than 15% Mo, 0.05 to 15% Mn, 0 to 8% V, 0 to 8% Nb, 0 to 10% Si, less than 0.5% N and 0.005 to 5% C.

12. The method of claim 1, wherein the powder is magnetic.

13. The method of claim 1, wherein the metal substrate is surface coated during the submerged arc welding.

14. The method of claim 1, wherein an additional amount of the powder is fed into the weld pool at a location ahead of the submerged arc.

15. The method of claim 1, wherein the powder is magnetically attached to electrode wires.

16. The method of claim 1, wherein the powder is magnetically attached to the one or more electrode cords.

17. The method of claim 1, wherein the welding is carried out with a single electrode wire or a single electrode cord.

18. The method of claim 1, wherein the substrate is a low alloy steel substrate.

19. The method is claim 1, wherein the powder consists essentially of the prealloyed powder.

20. The method of claim 1, wherein the weld pool is supplied with an amount of filler metal such that the powder comprises 30 to 80% of the total filler metal.

21. The method of claim 1, wherein the powder is an iron-based powder having at least 2% by weight of one or more elements selected from the group consisting of Cr, Ni, Mo, Mn, V, Nb, Si, N, C, Co, Ti and W.

22. The method of claim 1, wherein the substrate comprises a tool steel.

23. The method of claim 1, wherein the weld pool is covered by a flux.

* * * * *